Oct. 21, 1969   H. HUEBSCHER   3,474,460
POSITION MONITORING SYSTEM
Filed Aug. 31, 1967   2 Sheets-Sheet 1

POSITION MONITORING SYSTEM

INTERROGATOR 10

ANALOG DISCHARGE CIRCUIT 41

United States Patent Office 3,474,460
Patented Oct. 21, 1969

3,474,460
POSITION MONITORING SYSTEM
Herbert Huebscher, New Hyde Park, N.Y., assignor, by mesne assignments, to Hazeltine Corporation
Filed Aug. 31, 1967, Ser. No. 664,691
Int. Cl. G01s 9/56
U.S. Cl. 343—6.5      16 Claims

ABSTRACT OF THE DISCLOSURE

Position monitoring systems and other systems are disclosed which are usable to monitor motor vehicle positions under multiple-path transmission conditions as may exist in a city. At a central station, a signal generator repetitively generates coded interrogation signals for interrogating mobile transponders. Each transponder has timing and transmitting circuitry which transmits a reply signal in a time interval, which is unique with respect to all other transponders in the system. The received reply signal is acted upon by a data processor, operating in synchronism with the signal generator, to identify the reply from each transponder on a time basis for monitoring the transponders' positions. Other embodiments are also covered.

SUMMARY OF THE INVENTION

This invention relates to position monitoring systems, and more particularly to cooperative position monitoring systems which utilize interrogators and transponders and to such systems which are usable under conditions of severe multiple-path transmission caused by reflecting objects such as buildings in a city.

Objects of this invention are to provide new and improved cooperative position monitoring systems; to provide such systems wherein reply signals from transponders are distinguishable on a time basis; and to provide such systems which are not subject to failure in the presence of multiple-path transmissions due to reflections.

In accordance with the invention, there is provided a position monitoring system in which signals are generated at a central station for interrogating a plurality of mobile transponders and wherein every interrogated transponder generates a reply signal which is received within a time interval prescribed for that transponder for permitting determination of the position of each transponder. The system includes an interrogator having means for generating a coded interrogation signal including a reference portion and suitable for transmission to a transponder. The system further includes a plurality of transponders, each having means responsive to the coded interrogation signal in response to every interrogation signal received thereby for generating a reply signal for indicating a time interval relative to the reference portion, which is unique with respect to all other transponders included in the position monitoring system. The system also has processing means, included in the interrogator, operating in synchronism with the generating means and responsive to reply signals received from each transponder in a time interval, relative to the reference portion, which is unique with respect to all other transponders, for distinguishing the reply from each transponder on a time basis over reply signals received from all other transponders for providing an indication of each position of the transponder.

BRIEF DESCRIPTION OF THE DRAWINGS

Referring to the drawings.

DESCRIPTION OF THE INVENTION

Figure 1:
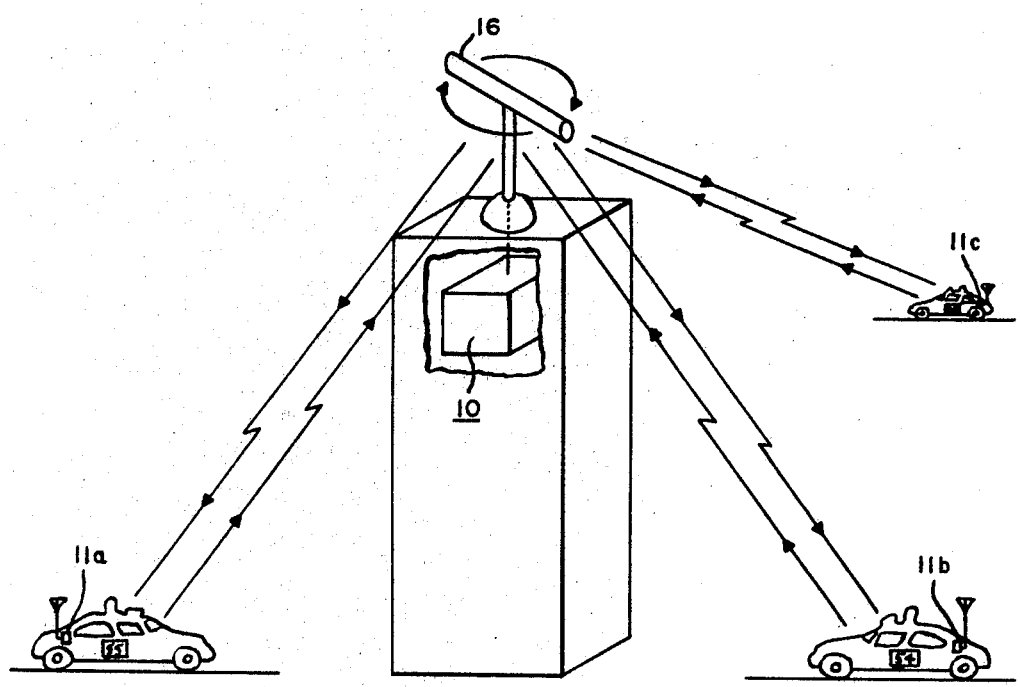
FIG. 1 is an overall perspective view of one form of position monitoring system, in accordance with the invention, in which vehicles are equipped with the transponders.

There is shown in FIG. 1 a perspective view of one form of position monitoring system having an interrogator 10, referred to for convenience as the central station, situated at a suitable location and shown as a building top and interior space. While the system of FIG. 1 shows three transponders 11a, 11b, and 11c, each located in a police car in this example, it will be recognized that any number of transponders may be included in a system.

Figure 2:
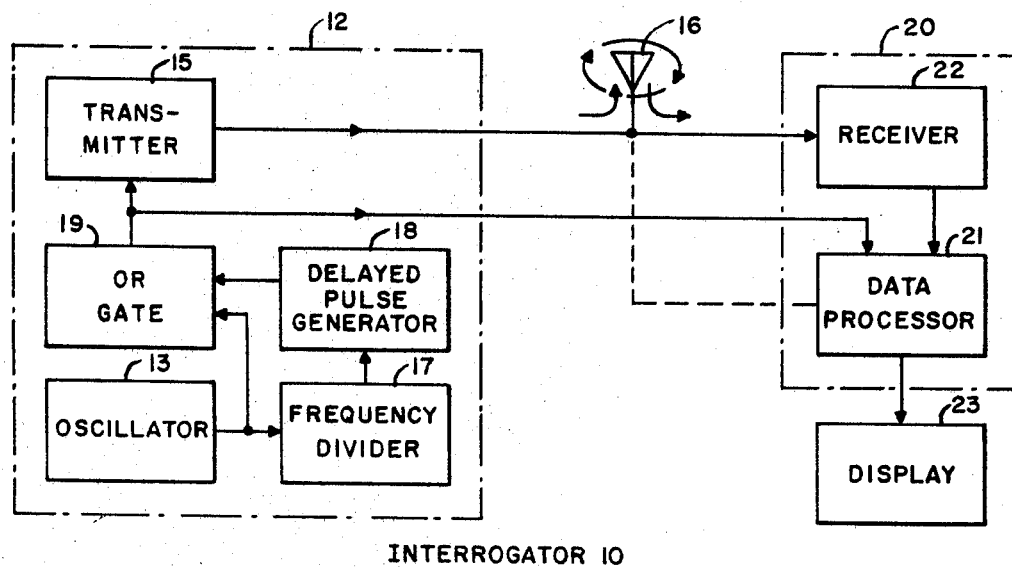
FIG. 2 is a block diagram of one form of interrogator constructed in accordance with the invention.

FIG. 2 is a block diagram of one form of interrogator 10 suitable for use in the FIG. 1 system. Interrogator 10 includes a first means 12 for generating a coded interrogation signal having a reference portion and suitable for transmission to transponders 11a, 11b, and 11c. Frist means 12 is depicted as including a source of clock pulses shown as oscillator 13, control means for generating a video frequency coded interrogation signal, and transmitting means, shown as transmitter 15 which receives the video frequency interrogation signal and provides a radio frequency interrogation signal suitable for transmission via antenna 16 to the transponders 11.

The control means includes frequency divider 17 which is supplied with clock pulses from oscillator 13, delayed pulse generator 18 whose input is connected to the output of frequency divider 17, and OR gate 19, having one input connected to the output of delayed pulse generator 18 and another input connected to oscillator 13. The video frequency interrogation signal is supplied at the output of OR gate 19.

Antenna 16 is shown as a rotating directional antenna designed to have a predetermined narrow horizontal beamwidth so that only transponders positioned in the narrow sector being interrogated, receive and transmit replies in response to the interrogated signal. Any suitable form of antenna system may be used, and many different arrangements including use of scanning antennas or use of omnidirective transmission with directional information derived on reception may be apparent to those skilled in the use of antennas.

Interrogator 10 also includes processing means 20, shown as including second means for translating the received reply signals and data processor 21. Second means is depicted as receiver 22 which may include a conventional arrangement of RF amplifier, local oscillator, mixer and IF amplifier and detector.

Data processor 21 operating in synchronism with first means 12, is responsive to the transponder reply signals and to the sector being interrogated by directional antenna 16, for determining the unique time intervals for distinguishing each reply signal over reply signals from all other transponders in the system, and for determining the azimuth of the replying transponders 11. Range data is obtained from the elapsed time between transmission of the interrogation signal via antenna 16 and reception of the reply signal from each transponder 11. Data processor 21 derives signals usable in indicating the position of each transponder, and which may be supplied to a display 23 for display thereon.

Figure 3:
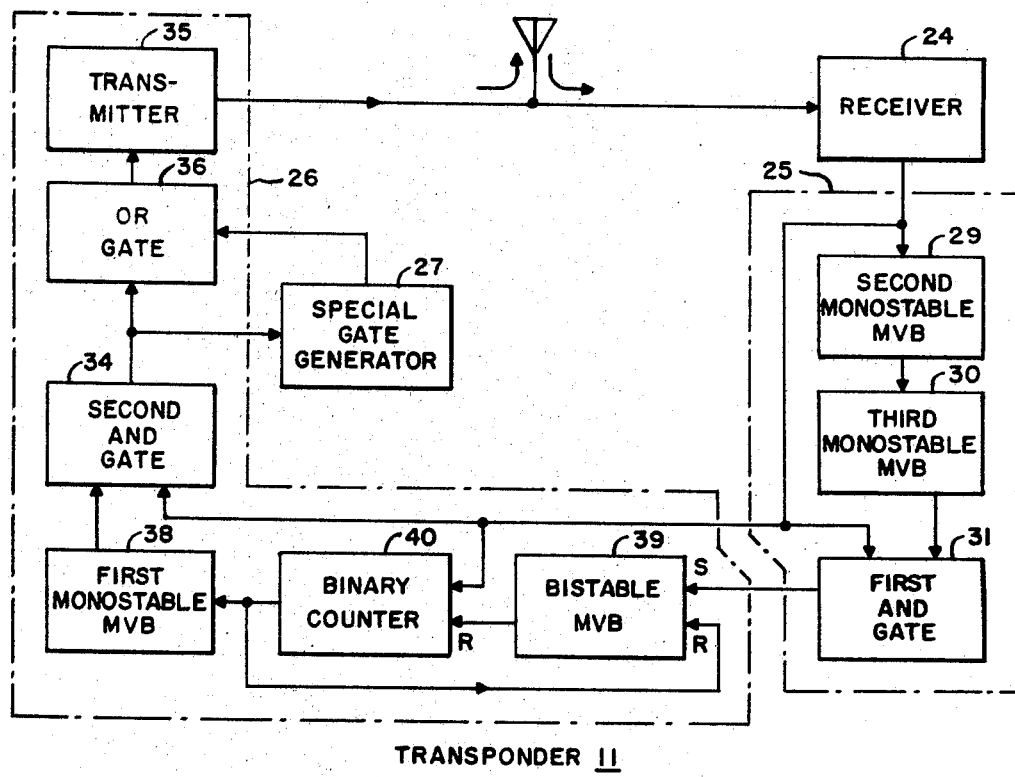
FIG. 3 is a block diagram of one form of transponder constructed in accordance with the invention.

FIG. 3 is a block diagram of one form of transponder 11, suitable for use in the FIG. 1 system, which is shown to include first means 24 for receiving a coded interrogation signal having a reference portion, second means 25 for deriving a synchronizing signal accurately indicative of the time of reception of the reference portion, and means 26 for deriving a reply signal, which, upon reception by the central station, is distinguishable on a time basis over reply signals received from all other transponders in the system. In addition, transponder 11 optionally includes special gate generator 27, for activation under special conditions for causing the signal deriving means to include an additional special reply pulse in the reply signal.

First means 24 is shown as a receiver which may include a conventional arrangement of RF amplifier, local oscillator, mixer and IF amplifier and detector. Second means 25 includes a delayed pulse generator, having a second monostable multivibrator 29, wose input is connected to the output of first means 24, and a third monostable multivibrator 30 connected in series with second monostable multivibrator 29, for generating a delay pulse corresponding to each received pulse and delayed by approximately the time between the first and second reference pulses. Second means 25 further includes a first AND gate 31 having one input coupled to the output of first means 24, another input connected to the output of third monostable multivibrator 30, and which provides the synchronizing signal at its output.

Reply signal deriving means 26 includes fourth means for deriving a control signal indicating a time interval which, relative to the reference portion, is unique with respect to all other transponders in the system, and third means responsive to the control signal for providing a reply signal suitable for transmission to the central station.

The third means is shown to include a second AND gate 34, and a transmitting means, shown as transmitter 35. AND gate 34 having one input coupled to the output of first means 24 and another input supplied with the control signal, supplies a video frequency reply signal to OR gate 36. OR gate 36, having one input connected to the output of AND gate 34 and another input connected to the output of the emergency gate generator 27, provides the video frequency reply signal, including the additional emergency reply pulse when required, at its output. The video frequency reply signal is supplied to transmitter 35 which provides a radio frequency reply signal for transmission to the central station.

The fourth means includes a timing device for deriving a timing signal a predetermined time after receipt of the synchronizing signal and a control gate generator, first monostable multivibrator 38, for deriving the control signal supplied to the third means. The timing device is shown to include bistable multivibrator 39 which is "set" by the synchronizing signal for generating a gating signal, and binary counter 40 "reset" by the gating signal and whose input is coupled to the output of first means 24 for providing the timing signal to the input of first monostable multivibrator 38.

SYSTEM OPERATION:

First interrogator means 12 repetitively generates an interrogation signal which is transmitted to the mobile transponders via antenna 16. The signal has a reference portion consisting of consecutive first and second reference pulses. The time interval between the two reference pulses is different from the time interval between any other two consecutive pulses in the signal so that the transponder 11 can accurately determine the time of reception of the reference portion. However, any desired technique may be used to indicate the reference portion, such as the transmission of a reference pulse whose height differs from that of the remaining pulses.

Each interrogated transponder 11 transmits a reply signal in a time interval which, relative to the reference portion, is unque with respect to all other transponders in the system so that the received reply signal, upon reception by the central station, is distinguishable over reply signals received from all other transponders in the system.

For purposes of illustration assume a system of 200 transponders, and a miximum anticipated range of approximately ten miles from interrogator 10 to the farthest transponder 11 to be interrogated. Assume as well an interrogation signal repetition rate of approximately 25 Hz. on a radio frequency carrier such as 1000 mHz., and that it is desired to generate an interrogation signal having first and second consecutive reference pulses in an exclusive time relationship, as well as a separate pulse, occurring in a unique time interval, for each transponder to be interrogated. This particular form of interrogation signal is usable, for example, in interrogating the transponder 11 of FIG. 3.

In the above system, oscillator 13 of interrogator 10 may be chosen to generate clock pulses approximately two microseconds wide and at a rate of 5 kHz. Frequency divider 17 and delayed pulse generator 18 operate in synchronism with oscillator 13 to provide an approximately two microsecond wide pulse after every 201 pulses provided by oscillator 13. This pulse is, in addition, delayed a predetermined time such as sixty microseconds, with respect to the 201st pulse. The clock pulses and delayed pulse are supplied to separate inputs of OR gate 19 which provides the video froquency interrogation signal at its output. This signal is supplied to transmitter 15 which provides the radio frequency interrogation signal for transmission to the transponders 11 at the 1000 mHz. radio frequency. Each repetitive interrogation signal will contain 202 pulses—two pulses approximately 60 microseconds apart which are to be the reference pulses, and 200 additional pulses, each approximately 200 microseconds apart. Any distinguishable time interval between pulses may be used and the above were selected primarily for convenience.

In the embodiment shown, each separate individual pulse transmitted by interrogator 10 occurs in a unique time interval designated for a particular transponder 11 which transmits its reply signal immediately upon reception thereof. The elapsed time between transmission by interrogator 10 of this individual pulse and reception of the reply signal transmitted by the transponder 11 in response thereto, is used for determining Range. Therefore, the spacing between these individual pulses should be sufficient to permit interrogator 10 to receive the reply signal from the previously replying transponder 11, despite signal distortions due to reflection from various objects.

In an alternative arrangement, for example, where the interrogator and the transponders are synchronized such as by a master clock, no separate individual pulses need be transmitted in the interrogation signal. Each transponder 11 is responsive to the time of reception of the reference portion and replies in a unique time interval assigned to it. In such embodiments, the time between transmission of the reference portion by the interrogator 10, and reception of the reply signal transmitted by each transponder 11 in response thereto, may be used in determining Range. Therefore, each unique time interval should be of sufficient duration to preclude the overlapping of reply signals transmitted by the transponders 11 despite signal reflections from various objects.

In the embodiment shown, the transmitted interrogation signal is received by first means 24 of each transponder 11 positioned in the sector being interrogated. It may then be shaped, if desired, to sharpen the pulses and the shaped signal supplied to the delayed pulse generator of second transponder means 25. The delayed pulse generator generates a pulse corresponding to each undelayed pulse as received, but delayed sixty microseconds, a time substantially equal to the time between the two reference pulses. These delayed pulses are supplied to one input of second AND gate 34, and the shaped undelayed received pulses to another input.

The synchronizing signal, developed at the beginning of each repetitive sequence, is provided at the output of AND gate 34 upon time coincidence of an undelayed received pulse and a delayed pulse generated for the previously received undelayed pulse. This signal is derived only upon time coincidence between the second received reference pulse and the delayed pulse corresponding to the previously received first reference pulse, since only the reference pulses are sixty microseconds apart. The synchronizing signal "sets" bistable multivibrator 39 which "resets" binary counter 40. Counter 40 then counts the undelayed pulses, as received, and generates a timing signal after a predetermined count is reached. The counter 40 in each transponder 11 is preset to generate the timing signal after reaching a different count so that each transponder 11 generates a timing signal in a different unique time interval. For example, the counter 40 in transponder 11a may generate the timing signal upon reception of the first separate individual received pulse, transponder 11b upon reception of the second, and so on. The timing signal resets bistable multivibrator 39 and also activates first monostable multivibrator 38, which generates a control signal for a predetermined time. The control signal in each transponder 11 is thus generated in a time interval, relative to the reference pulses, which is unique with respect to the control signals generated by all other transponders in the system. The control signal is applied to one input of second AND gate 34 and the shaped undelayed received pulses to the other. The output of second AND gate 34 is a single pulse in the unique time interval assigned to that transponder 11. The output of second AND gate 34 is the video frequency reply signal, which is coupled through OR gate 36 to transmitter 35 for transmission to the central station. In the alternative arrangement, where no separate individual pulses are transmitted by interrogator 10, second AND gate 34 may be omitted. In this instance, the output of first monostable multivibrator 38 provides the video frequency reply signal which is coupled through OR gate 36 to transmitter 35.

Special gate generator 27 which, when activated in an emergency or under special conditions, causes the video frequency reply signal which is coupled to transmitter 35 to contain an additional or special reply pulse within the unique time interval. This reply pulse is generated after the regular reply pulse and is spaced sufficiently therefrom to preclude any overlapping of these pulses when received at the central station. Moreover, different predetermined spacings between these pulses may be used for indicating various prescribed special conditions.

The reply signals are received by receiver 22 of interrogator 10 at the central station, and supplied to data processor 21. Data processor 21 determines the particular time intervals and the sector being interrogated when each reply signal is received, to provide signals for indicating the position of each transponder in the system. As shown, these positional signals may then be supplied to display 23. Reception of two reply pulses from one transponder 11 in any one time interval denotes a special condition, which may also be shown on display 23.

DESCRIPTION AND OPERATION OF THE CIRCUIT OF FIG. 4

Figure 4:
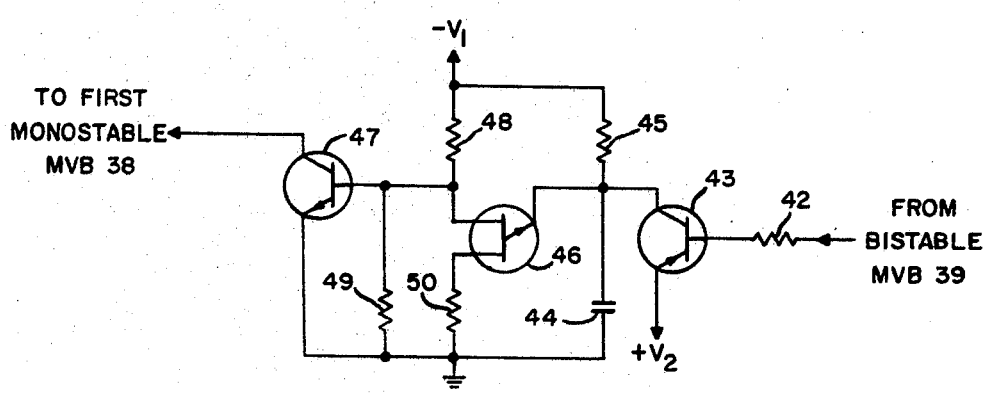
FIG. 4 is a schematic diagram of a variation of the transponder shown in FIG. 3 and which also embodies the invention.

In FIG. 4, there is shown an analog discharge circuit 41 which may be substituted for the FIG. 3 binary counter 40, with the attendant elimination of the provision for supplying undelayed received pulses thereto.

Analog discharge circuit 41 includes coupling resistor 42, connected to the base of first transistor 43 whose collector is connected via capacitor 44 to a reference potential shown as ground, via resistor 45 to a bias voltage shown as $-V_1$, and also to the emitter of unijunction transistor 46. The emitter of first transistor 43 is connected to another bias voltage shown as $+V_2$. The first base of unijunction transistor 46 is connected to the base of a second transistor 47, and via resistors 48 and 49 to $-V_1$ and ground, respectively; the second base is connected to ground via resistor 50. The emitter of second transistor 47 is connected to ground, and the timing signal is provided at the collector, which is connected to first monostable multivibrator 38.

The gating signal supplied to resistor 42 cuts off saturated first transistor 43, so that the voltage at the collector begins decaying from a value of approximately $+V_2$ toward a value of approximately $-V_1$. When the voltage at the collector of first transistor 43 decays to a predetermined amount, unijunction transistor 46 saturates, in turn, saturating second transistor 47 to supply the timing signal to first monostable multivibrator 38 after a predetermined time. This predetermined time is different in each circuit 41, just as in the FIG. 3 embodiment where each counter 40 counts a different prescribed number of pulses before providing the timing signal.

The predetermined time for each discharge circuit 41 is made unique, for example, by varying the magnitudes of capacitor 44, resistor 45, or the bias voltages $-V_1$ or $+V_2$, so that the reply signal from each transponder 11 will be received in a unique time interval prescribed for that transponder 11.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A position monitoring system in which signals are generated at a central station for interrogating a plurality of mobile transponders and wherein every interrogated transponder generates a reply signal which is received within a time interval prescribed for that transponder for permitting determination of the position of each transponder, comprising:

an interrogator having means for generating a coded interrogation signal including a reference portion and suitable for transmission to a transponder;

a plurality of transponders, each having means responsive to said coded interrogation signal for generating a reply signal in response to every interrogation signal received thereby for indicating a time interval, relative to said reference portion, which is unique with respect to all other transponders included in said position monitoring system; and processing means, included in said interrogator, operating in synchronism with said generating means and responsive to reply signals received from each transponder in a time interval, relative to said reference portion, which is unique with respect to all other transponders, for distinguishing the reply from each transponder on a time basis over reply signals received from all other transponders for providing an indication of the position of each transponder.

2. A position monitoring system as described in claim 1, wherein the transponder includes means for generating a reply signal at a time, relative to said reference portion, which is unique with respect to all other transponders included in said position monitoring system and the timing of the reply signal is arranged so that said reply signal is distinguishable despite reflections from various objects.

3. A position monitoring system in which signals are generated at a central station for interrogating a plurality of mobile transponders and wherein a reply signal from each interrogated transponder is received within a time interval prescribed for that transponder for permitting the determination of the position of each transponder, comprising:

an interrogator, having means for generating a coded interrogation signal including a reference portion and suitable for transmission to a transponder, and having processing means operating in synchronism with the generating means and responsive to reply signals received from the transponder, for distinguishing the reply from each transponder on a time basis over reply signals received from all other transponders for providing an indication of the position of each transponder; and at least one transponder, having first means for receiving a coded interrogation signal including a reference portion, second means coupled to said first means for deriving a synchronizing signal accurately indicative of the time of reception of said reference portion, third means responsive to a supplied control signal for deriving a reply signal suitable for transmission to the central station, and fourth means responsive to said synchronizing signal for deriving a control signal indicating a time interval relative to said reference portion which is unique with respect to all other transponders included in said position monitoring system, and for supplying said control signal to said third means for causing said third means to derive said reply signal, which, upon reception by said central station, is distinguishable on a time basis over reply signals received from all other transponders.

4. An interrogator for use in a central station of a position monitoring system in generating signals suitable for interrogating a plurality of mobile transponders and wherein every interrogated transponder generates a reply signal which is received within a unique time interval prescribed for that transponder for identifying each transponder on a time basis, comprising:

first means for generating a coded interrogation signal having a reference portion and suitable for transmission to the transponders, every interrogated transponder generating a reply signal in response to each interrogation signal received thereby; and processing means, operating in synchronism with the first means and responsive to reply signal sreceived from each transponder in a time interval, relative to said reference portion, which is unique with respect to all other transponders, for distinguishing the reply signals from each transponder on a time basis over reply signals received from all other transponders for providing an indication of the position of each transponder.

5. An interrogator as described in claim 4, wherein the processing means includes second means for translating the received reply signals, and a data processor operating in synchronism with the first means for distinguishing the reply signal from each transponder on the basis of said unique time intervals for deriving signals usable in indicating the position of each transponder.

6. An interrogator as described in claim 4, wherein the first means includes a source of clock pulses, a control means, responsive to the clock pulses for generating a video frequency interrogation signal, and a transmitting means responsive to said video frequency interrogation signal for providing a radio frequency interrogation signal having a plurality of pulses occurring in a repetitive sequence, including at least one reference pulse, and a separate pulse occurring in a unique time interval for each transponder to be interrogated.

7. A transponder usable in a position monitoring system wherein a plurality of transponders may transmit identical reply signals in response to interrogation signals from a central station, the reply signals, upon reception by the central station, being distinguishable on a time basis, comprising:

first means for receiving a coded interrogation signal having a reference portion;

second means coupled to said first means for deriving a synchronizing signal accurately indicative of the time of reception of said reference portion; and means responsive to said synchronizing signal for deriving a reply signal which, upon reception by a central station, is distinguishable on a time basis, relative to said reference portion, over identical reply signals received from all other transponders included in the position monitoring system.

8. A transponder as described in claim 7, wherein said raply signal deriving means derives a reply signal in a time interval which relative to said reference portion, is unique with respect to all other transponders included in said position monitoring system.

9. A transponder as described in claim 7, wherein said reply signal deriving means includes: third means responsive to a supplied control signal for providing a reply signal suitable for transmission to a central station; and fourth means responsive to said synchronizing signal for deriving a control signal indicating a time interval which, relative to said reference portion, is unique with respect to all other transponders included in said position monitoring system, and for supplying said control signal to said third means for causing said third means to derive said reply signal, which, upon reception by said central station, is distinguishable on a time basis over reply signals received from all other transponders.

10. A transponder as described in claim 9, wherein the fourth means includes a timing device responsive to the synchronizing signal for deriving a timing signal a predetermined time after receipt of the synchronizing signal, and a control gate generator responsive to the timing signal for providing said control signal.

11. A transponder as described in claim 10, wherein the timing device includes a bistable multivibrator responsive to the synchronizing signal for generating a gating signal, and an analog discharge circuit whose discharge is initiated by said discharge signal for providing said timing signal after discharging for said predetermined time.

12. A transponder as described in claim 9, wherein the first means receives a coded interrogation signal having a plurality of pulses occurring in a repetitive sequence, including at least one reference pulse, and a separate pulse occurring in a unique time interval for each transponder to be interrogated, and wherein the fourth means includes a timing device having a bistable multivibrator responsive to the synchronizing signal for generating a gating signal, and a binary counter responsive to said gating signal and additionally responsive to the pulses of the received interrogation signal for providing said timing signal after counting a prescribed number of said received pulses.

13. A transponder for use in a position monitoring system wherein a plurality of transponders are distinguished by the timing of replies transmitted in response to interrogation signals from a central station, comprising:

first means for receiving a coded interrogation signal having a plurality of pulses occurring in a repetitive sequence including, at the beginning of each sequence, consecutive first and second reference pulses having an exclusive time relationship;

a delayed pulse generator coupled to the first means for generating a delayed pulse corresponding to each received pulse and delayed by approximately the time between said first and second reference pulses;

a first AND gate responsive to the undelayed received pulses and to said delayed pulses for deriving a synchronizing signal upon time coincidence between said second received reference pulse and the delayed pulse corresponding to the previously received first reference pulse for indicating receipt of the reference pulses and the beginning of each sequence;

third means responsive to a supplied control signal for deriving a reply signal suitable for transmission to a central station;

a timing device responsive to the synchronizing signal for generating a timing signal a predetermined time after receipt of the synchronizing signal;

a first monostable multivibrator responsive to the timing signal for deriving a control signal indicating a time interval, relative to the time of reception of said reference pulses, which is unique with respect to all other transponders included in said position monitoring system, and for supplying said control signal to said third means for causing said third means to derive said reply signal which, upon reception by said central station, is distinguishable on a time basis over reply signals received from all other transponders.

14. A transponder as described in claim 13, wherein the timing device includes a bistable multivibrator responsive to the synchronizing signal for generating a gating signal, and an analog discharge circuit whose discharge is initiated by said gating signal for providing said timing signal after discharging for said predetermined time.

15. A transponder as described in claim 13, wherein said first means receives a coded interrogation signal additionally having a separate pulse occurring in a unique time interval for each transponder to be interrogated, and wherein said timing device includes a bistable multivibrator responsive to the synchronizing signal for generating a gating signal, and a binary counter responsive to said gating signal and additionally responsive to the pulses of the received interrogation signal for providing said timing signal after counting a prescribed number of said received pulses.

16. A transponder as described in claim 13, wherein the third means includes a second AND gate responsive to said control signal and to the received pulses for generating a video frequency reply signal within said time interval, and a transmitting means responsive to said video frequency signal for providing a radio frequency reply signal, and which further includes a special gate generator operating in synchronism with said video frequency signal for activation under special conditions for causing the transmitting means to provide an additional special reply pulse in said signal within said time interval.

References Cited

UNITED STATES PATENTS

| | | | |
|---|---|---|---|
| 3,153,232 | 10/1964 | Fletcher et al. | 343—6.5 X |
| 3,178,705 | 4/1965 | Clock et al. | 343—6.8 |
| 3,312,971 | 4/1967 | Gehman | 343—6.5 |
| 3,336,591 | 8/1967 | Michnik et al. | 343—6.5 |
| 3,341,846 | 9/1967 | McMurren et al. | 343—6.8 |

RODNEY D. BENNETT, JR., Primary Examiner

M. F. HUBLER, Assistant Examiner

U.S. Cl. X.R.

343—6.8